(12) United States Patent
Stearns et al.

(10) Patent No.: US 12,488,477 B2
(45) Date of Patent: Dec. 2, 2025

(54) SYSTEMS AND METHODS FOR MULTI-OBJECT TRACKING

(71) Applicant: Toyota Research Institute, Inc., Los Altos, CA (US)

(72) Inventors: Colton Stearns, Stanford, CA (US); Jie Li, Los Altos, CA (US); Rares A. Ambrus, San Francisco, CA (US); Vitor Campagnolo Guizilini, Santa Clara, CA (US); Sergey Zakharov, San Francisco, CA (US); Adrien D. Gaidon, San Jose, CA (US); Davis Rempe, Stanford, CA (US); Tolga Birdal, London (GB); Leonidas J. Guibas, Palo Alto, CA (US)

(73) Assignees: Toyota Research Institute, Inc., Los Altos, CA (US); Toyota Jidosha Kabushiki Kaisha, Aichi-ken (JP); The Board of Trustees of the Leland Stanford Junior University, Stanford, CA (US)

( * ) Notice: Subject to any disclaimer, the term of this patent is extended or adjusted under 35 U.S.C. 154(b) by 382 days.

(21) Appl. No.: 18/202,632

(22) Filed: May 26, 2023

(65) Prior Publication Data

US 2024/0013409 A1    Jan. 11, 2024

Related U.S. Application Data

(60) Provisional application No. 63/359,725, filed on Jul. 8, 2022.

(51) Int. Cl.
*G06T 7/246* (2017.01)

(52) U.S. Cl.
CPC .... *G06T 7/248* (2017.01); *G06T 2207/10028* (2013.01); *G06T 2207/20081* (2013.01); *G06T 2207/20084* (2013.01)

(58) Field of Classification Search
CPC .......... G06T 7/248; G06T 2207/10028; G06T 2207/20081; G06T 2207/20084; G06T 7/246
(Continued)

(56) References Cited

U.S. PATENT DOCUMENTS 8,170,278 B2   5/2012  Zhao et al.
8,744,122 B2   6/2014  Salgian et al.
(Continued)

FOREIGN PATENT DOCUMENTS

CN    108805902 A    11/2018
CN    106095802 B     8/2019
(Continued)

OTHER PUBLICATIONS

Self-supervised 4D spatio-temporal feature learning via order prediction of sequential point cloud clip, URL: https://openaccess.thecvf.com/content/WACV2021/papers/Wang_Self-Supervised_4D_Spatio-Temporal_Feature_Learning_via_Order_Prediction_of_Sequential_WACV_2021_paper.pdf, Oct. 6, 2021.
(Continued)

*Primary Examiner* — Stephen P Coleman
(74) *Attorney, Agent, or Firm* — Dinsmore & Shohl LLP

(57) ABSTRACT

A method for multiple object tracking includes receiving, with a computing device, a point cloud dataset, detecting one or more objects in the point cloud dataset, each of the detected one or more objects defined by points of the point cloud dataset and a bounding box, querying one or more historical tracklets for historical tracklet states corresponding to each of the one or more detected objects, implementing a 4D encoding backbone comprising two branches: a first branch configured to compute per-point features for each of the one or more objects and the corresponding historical tracklet states, and a second branch configured to
(Continued)

obtain 4D point features, concatenating the per-point features and the 4D point features, and predicting, with a decoder receiving the concatenated per-point features, current tracklet states for each of the one or more objects.

20 Claims, 10 Drawing Sheets

(58) Field of Classification Search
USPC .......................................................... 382/103
See application file for complete search history.

(56) References Cited

U.S. PATENT DOCUMENTS

2018/0324141 A1* 11/2018 Wang ................. H04L 45/7453
2019/0248487 A1 8/2019 Holtz et al.
2022/0020158 A1 1/2022 Ning et al.

FOREIGN PATENT DOCUMENTS

| CN | 112287761 A | 1/2021 |
| CN | 113447949 A | 9/2021 |
| JP | 2008230467 A | 10/2008 |
| KR | 102225147 B1 | 3/2021 |

OTHER PUBLICATIONS

CaSPR: Learning Canonical Spatiotemporal Point Cloud Representations, URL: https://proceedings.neurips.cc//paper/2020/file/9de6d14fff9806d4bcd1ef555be766cd-Paper.pdf, Oct. 6, 2021.
Center-based 3D Object Detection and Tracking, Tianwei Yin et al., URL: https://arxiv.org/pdf/2006.11275.pdf, Jan. 6, 2021.
LiDAR R-CNN: An Efficient and Universal 3D Object Detector, Zhichao Li et al., URL: https://arxiv.org/pdf/2103.15297.pdf, Mar. 9, 2021.
Offboard 3D Object Detection from Point Cloud Sequences, Charles Qi et al., URL: https://arxiv.org/pdf/2103.05073.pdf, Mar. 8, 2021.

* cited by examiner

SYSTEMS AND METHODS FOR MULTI-OBJECT TRACKING

CROSS-REFERENCE TO RELATED APPLICATION

This application claims priority to U.S. Provisional Application No. 63/359,725 filed Jul. 8, 2022, the disclosure of which is incorporated herein by reference in its entirety.

TECHNICAL FIELD

Embodiments described herein generally relate to systems and methods for detecting, localizing, and tracking one or more objects of interests in an attention area using a computer-assisted light detector, such as a light detection and ranging (LIDAR) module to conduct multi-object tracking (MOT).

BACKGROUND

Multi-object tracking (MOT) is a task modern robotic systems utilize to operate in the real world. MOT is a capability that enables navigation of autonomous platforms in dynamic environments, which includes connecting object detection with downstream tasks such as path-planning and trajectory forecasting. However, establishing high-fidelity object tracks for such applications can be a challenge because small errors in 3D tracking can lead to significant failures in downstream tasks. Many factors can affect the accuracy of the collected object data by a light detection and ranging (LIDAR) module, such as fog, rain, objects carried around by wind, and the like. These may cause a LIDAR module to generate erroneous and misleading information. Accordingly, a need exist for a system or a method of 3D multi-object tracking (3D MOT) applying to a LIDAR module to tolerate or self-correct errors.

SUMMARY

In one embodiment, a method for multiple object tracking includes receiving, with a computing device, a point cloud dataset, detecting one or more objects in the point cloud dataset, each of the detected one or more objects defined by points of the point cloud dataset and a bounding box, querying one or more historical tracklets for historical tracklet states corresponding to each of the one or more detected objects, implementing a 4D encoding backbone comprising two branches: a first branch configured to compute per-point features for each of the one or more objects and the corresponding historical tracklet states, and a second branch configured to obtain 4D point features, concatenating the per-point features and the 4D point features, and predicting, with a decoder receiving the concatenated per-point features, current tracklet states for each of the one or more objects.

In another embodiment, a system for multiple object tracking includes a computing device, the computing device comprising a processor and a memory storing instructions that, when executed by the processor, cause the computing device to: receive a point cloud dataset; detect one or more objects in the point cloud dataset, each of the detected one or more objects defined by points of the point cloud dataset and a bounding box; query one or more historical tracklets for historical tracklet states corresponding to each of the one or more detected objects; implement a 4D encoding backbone comprising two branches: a first branch configured to compute per-point features for each of the one or more objects and the corresponding historical tracklet states, and a second branch configured to obtain 4D point features; concatenate the per-point features and the 4D point features; and predict, with a decoder receiving the concatenated per-point features, current tracklet states for each of the one or more objects.

In another embodiment, a computing program product for multiple object tracking, the computing program product comprising machine-readable instructions stored on a non-transitory computer readable memory. The machine-readable instructions, which when executed by a computing device, cause the computing device to carry out steps comprising: receiving, with the computing device, a point cloud dataset; detecting one or more objects in the point cloud dataset, each of the detected one or more objects defined by points of the point cloud dataset and a bounding box; querying one or more historical tracklets for historical tracklet states corresponding to each of the one or more detected objects; implementing a 4D encoding backbone comprising two branches: a first branch configured to compute per-point features for each of the one or more objects and the corresponding historical tracklet states, and a second branch configured to obtain 4D point features; concatenating the per-point features and the 4D point features; and predicting, with a decoder receiving the concatenated per-point features, current tracklet states for each of the one or more objects.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals.

DETAILED DESCRIPTION

Figure 1:
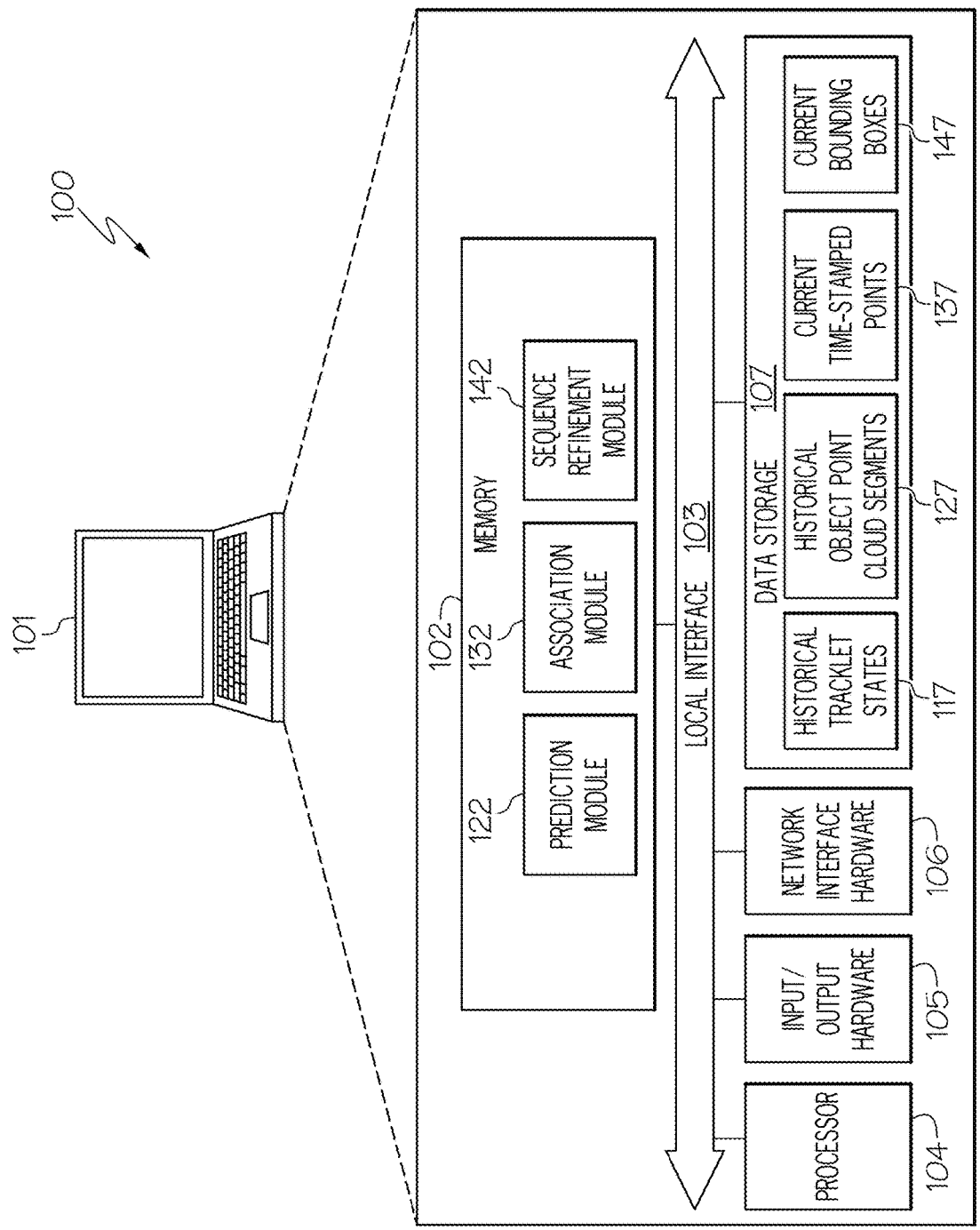
FIG. 1 schematically depicts an illustrative computing device configured to implement a spatiotemporal multiple-object tracking system, according to one or more embodiments shown and described herein.

Embodiments of the present disclosure provide systems and methods that improve the quality of 3D object detection by refining detections with long-term temporal information. 3D detection and multi-object tracking are the two foundational tasks in autonomous vehicle perception. Standard tracking-by-detection pipelines include identifying object proposals with a detector backbone, extracting features for each object in order to compute an affinity matrix, and passing the affinity matrix to a Hungarian algorithm for data association. However, there are at least two shortcomings within this standard pipeline. First, the pipeline does not make use of explicit object priors on shape and motion. Instead, it relies on a unidirectional information flow from scene points to object boxes. Second, the two-frame association strategy overlooks rich temporal information in motion and aggregation.

A challenge faced by 3D multi-object tracking (3D MOT) is that of data association when using LIDAR data as the main source of observation, due to the sparse and irregular scanning patterns inherent in time-of-flight sensors designed for outdoor use. Sensor fusion methods combine camera and LIDAR in an effort to provide appearance-based cues in 3D association. However, this comes at the cost of additional hardware requirements and increased system complexity. In an attempt to address the 3D association complexity, 3D MOT systems may use LIDAR data to address the association problem by matching single-frame tracks to current detection results with close 3D proximity. Single-frame detection results can be modeled as bounding boxes or center-points and compared to the same representation of the tracked objects from the last visible frame. Although this process touts simplicity, the strategy does not fully leverage the spatiotemporal nature of the 3D tracking problem such that the temporal context is over-compressed into a simplified motion model such as a Kalman filter or a constant-velocity assumption. Moreover, these approaches largely ignore the low-level information from sensor data in favor of abstracted detection entities, making them vulnerable to crowded scenes and occlusions.

Embodiments of the present disclosure include implementing a higher-level spatiotemporal object representation that is maintained alongside the existing detection-tracking pipeline, and can be used by the detection-tracking pipelines. For example, for each detected object, the method queries its current region and temporal history in the raw LIDAR point space, builds an object-centric, disentangled representation of the object shape and motion, and uses this object-representation to refine detection results and build a more robust tracking affinity matrix. Additionally, a spatiotemporal object representation that aggregates shape context and encodes second order object dynamics is designed to inform and improve 3D detection and multi-object tracking. As a result, an attention-based 4D point cloud backbone that processes batches of object sequences in real-time is provided.

In embodiments, systems and methods for 3D multi-object tracking ("3D MOT") use light detection and ranging ("LIDAR") methods. LIDAR uses light waves to map its surroundings at a higher resolution. LIDAR creates a 3D image of its surroundings by shooting out a pulse of light from the transmitter that travels to surround objects and is scattered. An optical sensor then detects the scattered light to calculate the distance between an object and the light source in LIDAR system based on the time of flight. 3D multi-object tracking aims to uniquely and consistently identify all mobile entities through time.

As described in more detail herein, embodiments of the present disclosure provide systems and methods of spatiotemporal object tracking by actively maintaining the history of both object-level point clouds and bounding boxes for each tracked object. The method disclosed herein provides embodiments that efficiently maintain an active history of object-level point clouds and bounding boxes for each tracklet. At each frame, new object detections are associated with these maintained past sequences of object points and tracklet status. The sequences are then updated using a 4D backbone to refine the sequence of bounding boxes and to predict the current tracklets, both of which are used to further forecast the tracklet of the object into the next frame. This refinement improves the quality of bounding-box and motion estimates by ensuring spatiotemporal consistency, allowing tracklet association to benefit from low-level geometric context over a long time horizon.

Referring to FIG. 1, an illustrative embodiment of a spatiotemporal multiple-object tracking system 100 for generating current tracklets $T_t$ using a prediction module 122, an association module 132, and a sequence refinement module 142 is depicted. The spatiotemporal multiple-object tracking system 100 may further comprise a LIDAR module (e.g. 710, FIG. 7) that detects the objects in an attention area and transfers information of the objects to the spatiotemporal multiple-object tracking system 100. The spatiotemporal multiple-object tracking system 100 depicted in FIG. 1 includes a computing device 101. The computing device may further comprise various components, such as a memory 102, a processor 104, an input/output hardware 105, a network interface hardware 106, a data storage 107, and a local interface 103.

The computing device 101 may be any device or combination of components comprising a processor 104 and a memory 102, such as a non-transitory computer readable memory. The processor 104 may be any device capable of executing the machine-readable instruction set stored in the non-transitory computer readable memory. Accordingly, the processor 104 may be an electric controller, an integrated circuit, a microchip, a computer, or any other computing device. The processor 104 may include any processing component(s) configured to receive and execute programming instructions (such as from the data storage component 107 and/or the memory component 102). The instructions may be in the form of a machine-readable instruction set stored in the data storage component 107 and/or the memory component 102. The processor 104 is communicatively coupled to the other components of the computing device 101 by the local interface 103. Accordingly, the local interface 103 may communicatively couple any number of processors 104 with one another, and allow the components coupled to the local interface 103 to operate in a distributed computing environment. The local interface 103 may be implemented as a bus or other interface to facilitate communication among the components of the computing device 101. In some embodiments, each of the components may operate as a node that may send and/or receive data. While the embodiment depicted in FIG. 1 includes a single processor 104, other embodiments may include more than one processor 104.

The memory 102 (e.g., a non-transitory computer readable memory component) may comprise RAM, ROM, flash memories, hard drives, or any non-transitory memory device capable of storing machine-readable instructions such that the machine-readable instructions can be accessed and executed by the processor 104. The machine-readable instruction set may comprise logic or algorithm(s) written in any programming language of any generation (e.g., 1GL, 2GL, 3GL, 4GL, or 5GL) such as, for example, machine language that may be directly executed by the processor 104, or assembly language, object-oriented programming (OOP), scripting languages, microcode, etc., that may be compiled or assembled into machine readable instructions and stored in the memory 102. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. For example, the memory component 102 may be a machine-readable memory (which may also be referred to as a non-transitory processor readable memory or medium) that stores instructions which, when executed by the processor 104, causes the processor 104 to perform a method or control scheme as described herein. While the embodiment depicted in FIG. 1 includes a single non-transitory computer readable memory 102, other embodiments may include more than one memory module.

The input/output hardware 105 may include a monitor, keyboard, mouse, printer, camera, microphone, speaker, and/or other device for receiving, sending, and/or presenting data. The network interface hardware 106 may include any wired or wireless networking hardware, such as a modem, LAN port, Wi-Fi card, WiMax card, mobile communications hardware, and/or other hardware for communicating with other networks and/or devices.

The data storage component 107 stores historical tracklet states 117, historical object point cloud segments 127, current time-stamped points 137 (e.g., $P_t$), and current bounding boxes 147. The historical tracklet states 117 (e.g., $S_{t-1}$) may comprise spatiotemporal information of historical tracklets $T_{t-1}$ in historical frames (t−K≤i≤t). The historical frames may comprise a sequence of frames from the (t−K) frame to the current frame (t−1), where K indicates a pre-determined length of maximum history and is greater than or equals to 2. In embodiments, K may be 3, 4, 5, 6, 7, 8, 9, 10, 11, 12, 13, 14, 15, 20, 25, 30, 35, or 40. The historical object point cloud segments 127 (e.g., $Q_{t-1}$) may comprise historical cropped point cloud regions $\tilde{P}_{t-1}$ in the historical frames. The current time-stamped points 137, $P_t$, and the current bounding boxes 147 may be generated by a LIDAR module 710 upon detecting objects in an attention area. It should be understood that the data storage component 107 may reside local to and/or remote from the computing device 101 and may be configured to store one or more pieces of data for access by the computing device 101 and/or other components.

The memory component 102 may include a prediction module 122, an association module 132, and a sequence refinement module 142. Additionally, the memory 102 may store historical data generated in the prediction module 122, the association module 132, and the sequence refinement module 142, such as a neural network model therein. The sequence refinement module 142 may further include a neural network module 242 comprising an encoder 410 and a decoder 420.

The sequence refinement module 142 may be trained and provided machine learning capabilities via a neural network as described herein. By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tan h function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling. The one or more ANN models may employ a combination of artificial intelligence techniques, such as, but not limited to, Deep Learning, Random Forest Classifiers, Feature extraction from audio, images, clustering algorithms, or combinations thereof.

In some embodiments, a convolutional neural network (CNN) may be utilized. For example, a convolutional neural network (CNN) may be used as an ANN that, in a field of machine learning, for example, is a class of deep, feed-forward ANNs applied for audio-visual analysis of the captured disturbances. CNNs may be shift or space invariant and utilize shared-weight architecture and translation.

Figure 2:
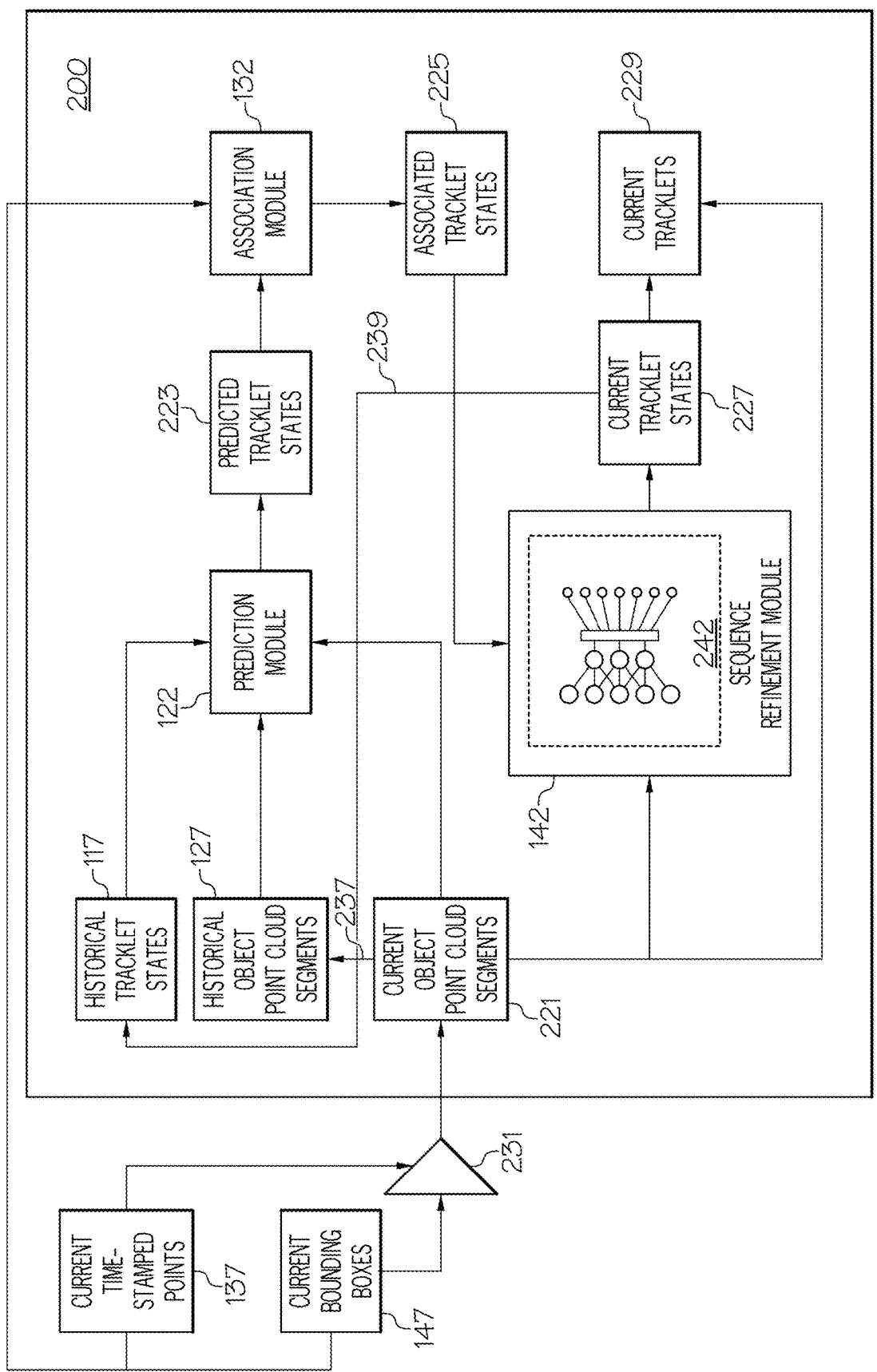
FIG. 2 schematically depicts an illustrative block diagram of an illustrative spatiotemporal multiple-object tracking system including a prediction module, an association module, and a sequence refinement module, according to one or more embodiments illustrated and described herein.

Referring to FIG. 2, a block diagram of a tracking pipeline 200 of the Spatiotemporal multiple-object tracking system 100 is depicted. The block diagram depicts the interconnection of input data, intermediate data, and models. The tracking pipeline 200 may perform tracking of one or more objects on the current frame t based on the current object data, such as current time-stamped points $P_t$ 137 and the current bounding boxes $b_t$ 147, and historical data in the historical frames (t−K≤i≤t−1), such as historical tracklets $T_{t-1}$ including historical object point cloud segments $Q_{t-1}$ 127 and historical tracklet states $S_{t-1}$ 117. The tracking pipeline 200 may then generate current tracklets $T_t$ 229 comprising the current object point cloud segments $Q_t$ 221 and current tracklet states $S_t$ 227. The current object point cloud segments $Q_t$ 221 and current tracklet states $S_t$ 227 may then be used to update the historical data for the object tracking in the next frame.

The current time-stamped points $P_t$ 137 and the current bounding boxes $b_t$ 147 may be generated by a LIDAR module, which will be given in further detail below. Each current bounding box $b_t$ 147 indicates a simulated boundary of an object detected in the attention area. Each current bounding box $b_t$ 147 is in the form of a 7-DoF amodal bounding box $b_i$ comprising locations $(x, y, z)_i$, dimensions $(l, w, h)_i$, and yaws $(\theta)_i$, in association with a confidence score $c_s$ between 0 and 1, from a given detector, from a given detector, where i indicates a frame i. The Spatiotemporal multiple-object tracking system 100 may have a cropping function 231 that crops the current time-stamped points $P_t$ according to a bounding box $b_t$ 147 associated with an object to generate a cropped point cloud regions $\hat{P}_t$ for that object. The cropping region may be tuned in the cropping function 231. For example, the cropping region may be enlarged by a factor greater than 1 (e.g. 1.25) to compensate an imperfect detection data due to the limitations of the LIDAR module.

In embodiments, the current object point cloud segments $Q_t$ 221 of an object at frame t represent the spatiotemporal information in the form of time-stamped points in the history frames and the current frame. The current object point cloud segments $Q_t$ 221 may comprise the cropped point cloud regions $\hat{P}_i$ in the historical frames and the current frame $(t-K \leq i \leq t)$, where a cropped point cloud regions $\hat{P}_i$ at frame i are the points cropped from the time-stamped points $P_i$ according to an associated bounding boxes $b_i$. The current object point cloud segments $Q_t$ 221 encode the spatiotemporal information from raw sensor observation in the form of time-stamped points in the frames $(t-K \leq i \leq t)$.

In embodiments, the current tracklet states $S_t$ for each object include the estimated state trajectory of the object within the historical and current frames $(t-K \leq i \leq t)$. The current tracklet states $S_t$ 227 may comprise states $s_i$ in the historical frames and current frame $(t-K \leq i \leq t)$. A state $s_i$ at a frame i comprises bounding boxes $b_i$, a birds-eye-view velocity $(v_x, v_y)$, and an object class c, in association with a confidence score $c_s$ from a given detector. In some embodiments, the current tracklet states $S_t$ 227 may comprise object sizes, per-frame object centers, and per-frame single features in the historical frames and the current frame $(t-K \leq i \leq t)$.

In embodiments, the Spatiotemporal multiple-object tracking system 100 may access the historical tracklets $T_{t-1}$ stored in the data storage component 107. The historical tracklets $T_{t-1}$ may comprise the historical object point cloud segments $Q_{t-1}$ 127 and historical tracklet states $S_{t-1}$ 117. The historical tracklet states $S_{t-1}$ 117 may comprise states $s_i$ in the historical frames $(t-K \leq i \leq t-1)$. The historical object point cloud segments $Q_{t-1}$ 127 may comprise the cropped point cloud regions $\hat{P}_i$ in the historical frames $(t-K \leq i \leq t-1)$.

In embodiments, the historical object point cloud segments $Q_{t-1}$ 127, historical tracklet states $S_{t-1}$ 117, and current object point cloud segments $Q_t$ 221 are input into the prediction module 122 to perform prediction. The current tracklets $\hat{T}_t$ are predicted based on the historical tracklets $T_{t-1}$. The current tracklets $\hat{T}_t$ comprise predicted tracklet states $\hat{S}_t$ 223 and the historical object point cloud segments $Q_{t-1}$ 127. The predicted tracklet states $\hat{S}_t$ 223 may then be input into the association module 132 along with the current time-stamped points $P_t$ 137 and the current bounding boxes $b_t$ 147. The association module may associate the current detected data and the predicted data by comparing these data to generate associated tracklets $\bar{T}_t$ comprising tracklet states $\bar{S}_t$ 225 and the current object point cloud segments $Q_t$ 221. The associated tracklets $\bar{T}_t$ may then be input into the sequence refinement module 142 to conduct a posterior tracklet update via a neural network module 242. The posterior tracklet update generates a refined current tracklet states $S_t$ 227. The Spatiotemporal multiple-object tracking system 100 may then output a current tracklet $T_t$ 229 comprising $Q_t$ 221 and $S_t$ 227.

In embodiments, the current object point could segments $Q_t$ 221 may be used to conduct an update 237 to the historical object point cloud segments $Q_{t-1}$ 127 for the future tracking pipeline operation. Similarly, the current tracklet states $S_t$ 227 may be used to conduct an update 239 to the historical tracklet states $S_{t-1}$ 117. The updated historical object point cloud segments $Q_{t-1}$ 127 and the updated historical tracklet states $S_{t-1}$ may be stored in the data storage component 107.

Figure 3:
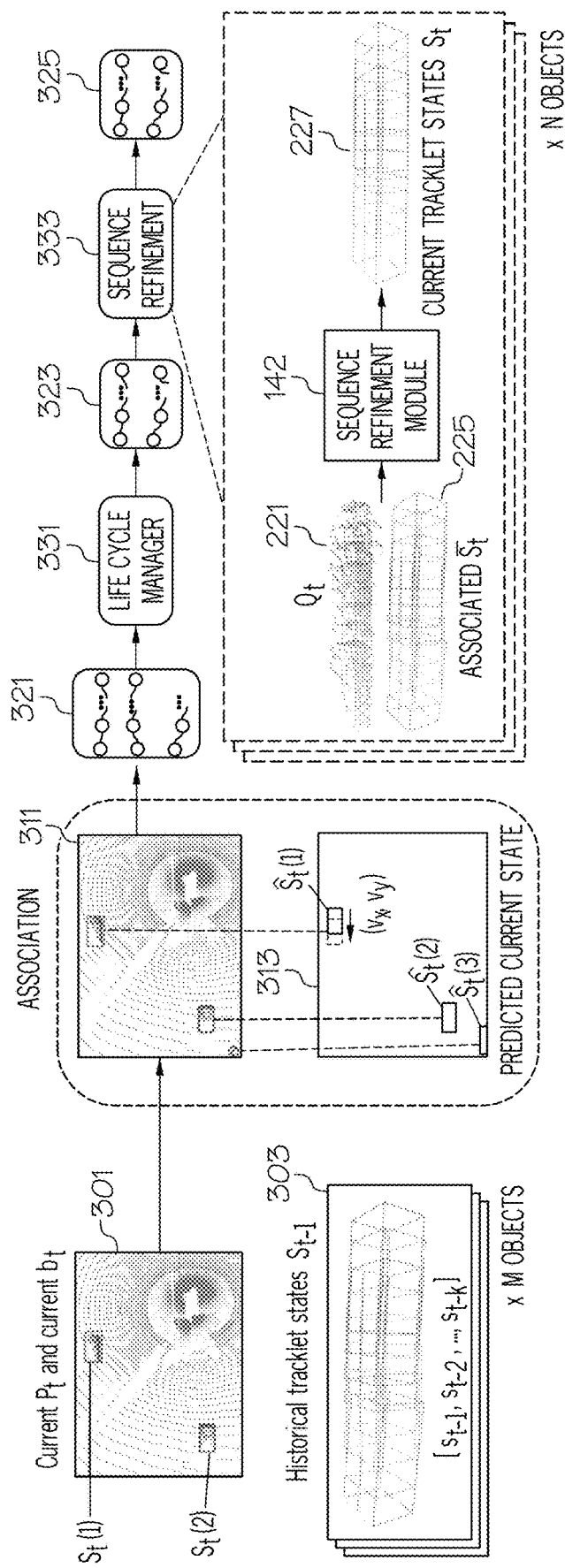
FIG. 3 schematically depicts a block diagram illustrating an implementation of the spatiotemporal multiple-object tracking system, according to one or more embodiments illustrated and described herein.

Referring to FIG. 3, an illustrative block diagram is illustrating an implementation of the spatiotemporal multiple-object tracking system 100 to perform a multi-object tracking (MOT) using a tracking pipeline. The spatiotemporal multiple-object tracking system 100 receives current environment data 301 as the raw sensor observation from the LIDAR module. The current environment data 301 may include the current time-stamped points $P_t$ 137, the current bounding boxes $b_t$ 147. The spatiotemporal multiple-object tracking system 100 generates object tracklet states for each detected objects, for example $S_t(1)$ for object 1 and $S_t(2)$ for object 2 in 301. The spatiotemporal multiple-object tracking system 100 accesses a historical tracklet states $S_{t-1}$ 303 with M historical detected objects. For example, as illustrated, three historical detected objects are found in the historical frames. Each $S_{t-1}$ 117 comprises (K-1) sequence states $S_i$ from $S_{t-1}$ to $S_{t-k}$ in the historical frames, where K indicates a pre-determined length of maximum history and is greater than or equals to 2. In embodiments, K may be 3, 4, 5, 6, 7, 8, 9, 10, 11, 12, 13, 14, 15, 20, 25, 30, 35, or 40. The spatiotemporal multiple-object tracking system 100 may use a historical tracklet states $S_{t-1}$ for each historical detected object to predict a current state 313. The prediction is performed based on the stored historical $T_{t-1}$. As disclosed herein, a state $s_i$ at a frame i comprises bounding boxes $b_i$, a birds-eye-view velocity $(v_x, v_y)$, and an object class c, in association with a confidence score $c_s$ from a given detector. The predicted tracklet states $\hat{S}_t$ 223 comprises predicted tracklets $\hat{s}_i$ in the frames $(t-K \leq i \leq t)$, where a predicted tracklet $\hat{s}_i$ at a frame i is predicted based on the tracklet $s_i$ at the frame i−1. The predicted tracklet states $\hat{S}_t$ 223 may be generated with equation 1 below.

$$\hat{S}_t = \{\hat{s}_i = (x+v_x, y+v_y, z, l, w, h, \theta, v_x, v_y, c, c_s)_{i-1}\}, t-K << i << t, \quad \text{EQ. 1}$$

where (x, y, z) represents the locations, (l, w, h) the dimensions, and yaws ($\theta$) the yaws of the bounding box $b_i$ of the associated object, in association with a confidence score $c_s$ between 0 and 1, from a given detector, from a given detector. For example, three predicted states $\hat{s}_t(1)$, $\hat{s}_t(2)$, and $\hat{s}_t(3)$ corresponding to historical detected objects 1, 2, and 3 are present in the predicted current data. The spatiotemporal multiple-object tracking system 100 compares the predicted tracklet states $\hat{S}_t$ 223 with the current time-stamped points $P_t$ 137 and the current bounding boxes $b_t$ 147 to associate the prediction data and current detected data and arrive at an associated detection 311. Through the comparison, the spatiotemporal multiple-object tracking system 100 may detect that one or more historical detected objects are not observed in the current detection. For example, the predicted $\hat{s}_t(3)$ associated with the object 3 is not shown in the current environment data 301. The associated detection may be concatenated with the historical tracklet states $S_{t-1}$ 117 to generate the associated tracklet states $\bar{S}_t$ 225 after concatenation 321, which would reflect any historical detected objects that move out of the attention area, such as the object 3. For example, in FIG. 3, the sequence refinement refines the tracklets for N objects, where N≤M.

In some embodiments, the tracking pipeline 200 of the spatiotemporal multiple-object tracking system 100 may include a life cycle manage block 331. The life cycle manage block 331 determines whether a detection bounding box will be initialized as a new tracklet and whether a tracklet will be removed when it is believed to have moved out of the attention area. Applying life cycle management to the associated tracklets may remove the objects that are present in the attention area in at least one of the historical frames, but out of the attention area in the current frame t. For example, the spatiotemporal multiple-object tracking system 100 may determine that object 3 has moved out of the attention area after conducting the life cycle manage block 331. The spatiotemporal multiple-object tracking system 100 then may remove the historical data of the object 3 and update the associated tracklet states $\overline{S}_t$ 225 as screened $\overline{S}_t$ 323.

The spatiotemporal multiple-object tracking system 100 may then conduct a sequence refinement block 333 in a sequence refinement module 142 (e.g., also referred to herein as a sequence-to-sequence refinement (SSR) module) with input of $Q_t$ 221 and associated tracklet states $\overline{S}_t$ 225 and output refined current tracklet states $S_t$ 227.

The spatiotemporal multiple-object tracking system 100 then finally outputs the $T_t$ 229 in the output block 325.

Figure 4:
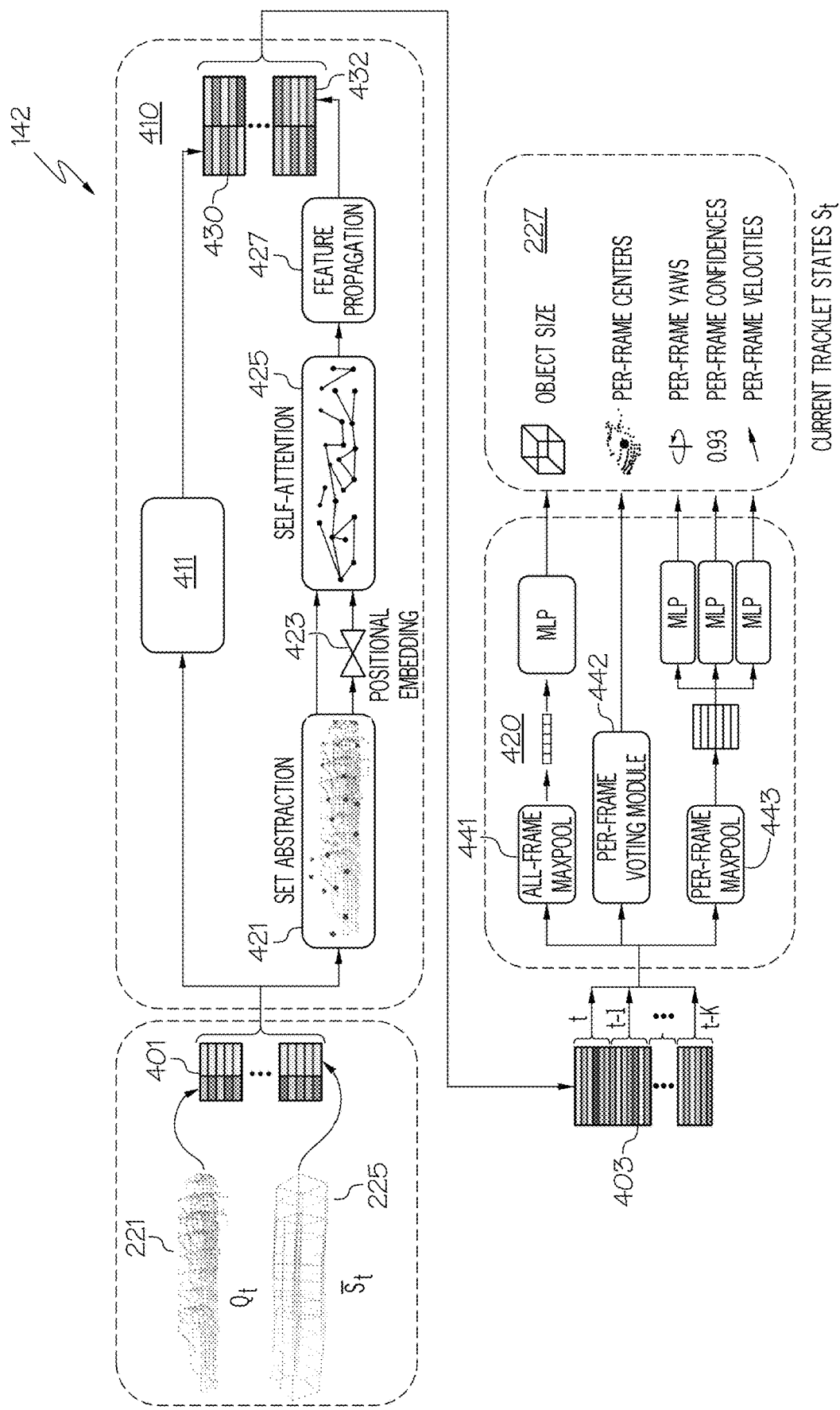
FIG. 4 schematically depicts an illustrative block diagram of a spatiotemporal sequence-to-sequence refinement (SSR) module in an illustrative tracking pipeline, according to one or more embodiments illustrated and described herein.

Referring to FIG. 4, an illustrative block diagram of a spatiotemporal sequence-to-sequence refinement (SSR) module 142 is depicted. The SSR module 142 takes the associated tracklet states $\overline{S}_t$ and the time-stamped object point cloud segments $Q_t$ as input and outputs refined final tracklet states $S_t$. The SSR module 142 first processes the sequential information with a 4D backbone to extract per-point context features. In a decoding stage, it predicts a global object size across all frames, as well as per-frame time-relevant object attributes including center, pose, velocity, and confidence. FIG. 4 depicts architecture of the sequence-to-sequence refinement (SSR) network. For example, given a tracklet containing object points and bounding boxes after association to a detection, the encoder first extracts spatiotemporal features corresponding to each input point. The features are given to the decoder that predicts a refined state trajectory and velocities to be used for subsequent association.

The SSR module 142 may include a neural network module 242, which includes an encoder 410 and a decoder 420. The encoder 410 may have a four-dimensional (4D) backbone to extract per-point context features. The decoder 420 may predict per-frame time-relevant object attributes and a global object size across the historical frames and the current frame.

The spatiotemporal multiple-object tracking system 100 may concatenate the current object point cloud segments $Q_t$ 221 and associated tracklet states $\overline{S}_t$ 225 into a set of low vectors 401, for example, as shown in FIG. 4, as a 2D vectors with the current object point cloud segments $Q_t$ 221 in the first column and $\overline{S}_t$ 225 in the second column. The concatenated data is then fed to the encoder 410. The encoder 410 appends the bounding-box information in the associated tracklet states $\overline{S}_t$ to each frame in the current object point cloud segments $Q_t$ 221 to yield a set of object-aware features. The object-aware features include time-stamped locations of the time-stamped points and parameters of bounding boxes. The encoder 410 includes a two-branch point cloud backbone, where the first branch, through a PointNet 411, encodes the stamped locations into per-point features 430, and the second branch encodes the parameters of bounding boxes $b_i$ into updated anchor features 432. That is, the encoder 410 is referred to as a split self-attention encoder.

The top part of the encoder 410 depicted in FIG. 4 illustrates the encoding backbone, which processes each associated tracklet independently. Since the inputs contain two streams of information $\overline{S}_t$, $Q_t$ which are at different levels of abstraction (object vs. point), first, the bounding-box-level information is appended as an additional dimension to each point in $Q_t$. This yields a set of object-aware features, which can be expressed as follows in Equation 2:

$$f_p = [x_p, y_p, z_p, t_p, x_c, y_c, z_c, \sin(\theta), \cos(\theta), s], \quad \text{EQ. 2}$$

where $(x_p, y_p, z_p, t_p)$ denotes the 4D geometric point and $(x_c, y_c, z_c, \theta, s)$ is the center location, yaw, and confidence score of the corresponding bounding box at frame $t_p$.

The encoder 410 is a two-branch point cloud backbone as depicted in FIG. 4. In the first branch, PointNet 411 is applied to directly encode the high-dimensional inputs into per-point features. The encoder 410 further applies layer normalization to the per-point features 430 and the updated anchor features 432, and concatenates the normalized per-point features 430 and the normalized updated anchor features 432 (e.g., 4D point features) to generate final per-point features 403.

For the second branch, which is depicted by blocks 421, 423, 425, and 427, a self-attention architecture is applied. First, a per-frame PointNet++ set abstraction layer 421 is applied, so that at each frame i we have a subsampled set of anchor-point features $\{a_i^k\}_{k=1}^A$ where A is a hyperparameter for the number of anchor points. For each anchor point, a 4D positional embedding is generated using a 3-layer multi-layer perceptron (MLP) expressed as Equation 3 below.

$$pos_{a_i^k} = MLP(a_i^k) \quad \text{EQ. 3}$$

The anchor features and positional embedding are concatenated as $$\left[ a_i^k, pos_{a_i^k} \right]$$

before applying four layers of self-attention 425 across all anchor features. This self-attention 425 allows information flow across both space and time. Finally, updated anchor features are propagated back to the full resolution point cloud via a feature propagation layer 427. Layer normalization is applied to the features from each branch before concatenating to get the final per-point features.

In other words, in the second branch, the encoder 410 is configured to apply a set abstraction layer 421 to subsample a set of anchor features 432 in each frame. The set abstraction layer 421 may include farthest point sampling (FPS) and/or local radii PointNet architecture.

Second, the encoder 410 is configured to apply a multi-layer perceptron to generate a positional embedding 423. Third, the encoder 410 concatenates the anchor features 432 and the positional embedding 423. Fourth, the encoder 410 applies multiple layers of self-attention 425 across all anchor features 432 to generate updated anchor features 432.

In embodiments, the encoding may generate 4D positional embeddings using a 3-layer multi-layer perceptron (MLP). As discussed herein, the encoder 410 adopts a self-attention 425 layer that allows information flow across both space and time. Further, the updated anchor features 432 may be propagated back to the full resolution point cloud via a feature propagation layer 427. In embodiments, layer normalization may be applied to the anchor features 432 from each branch before concatenating to get the final per-point features 403.

In embodiments, the encoder 410 may set the size of data processing. For example, each branch of the encoder 410 may use a 256-dim feature, yielding a concatenated 512-dim feature at the output. The encoder 410 may set parameters during encoding, for example setting abstraction uses A=10 anchor points per frame, a feature radius of 1.5 m for cars/vehicles, 0.6 m for pedestrians.

Still referring to FIG. 4, the SSR module 142 includes a decoder 420 that outputs a refined, ordered sequence of object states $S_t$ that is amenable to association in subsequent frames. To output object state trajectories, a decoder without an explicit prior, such as a decoder that directly predicts the ordered sequence of bounding boxes in one forward pass is used. This choice allows the model to learn temporal priors where needed through training. The design is motivated by the discontinuous nature of many sequences that the SSR module operates on, which contains identity switches, false-positives, and occlusions.

As depicted in the bottom portion of FIG. 4, the decoder 420 may predict the ordered sequence of bounding boxes $b_i$ in one forward pass is used such that the models to learn temporal priors may be trained. The decoder 420 may include an all-frame maxpool module 441, a per-frame voting module 442, and a per-frame maxpool module 443. Given an encoded set of per-point spatiotemporal features 403, features are grouped by their time of acquisition (i.e. by frame). The time-grouped point features are passed into 5 decoding heads. The first decoding head (e.g., the all-frame maxpool module 441) performs a max-pool on the entire feature set to regress a single object size (l, w, h), which is used for every output frame. The second head (e.g., the per-frame voting module 442) applies a voting module to each set of time-grouped features which outputs per-timestep object center predictions $(x_c, y_c, z_c)$. The remaining heads (e.g., per-frame maxpool module 443) perform a max-pool on each set of time-grouped features to obtain a single feature per timestep. This feature is passed through 2-layer MLPs to regress a yaw, confidence, and velocity ($\theta$, s, $v_x$, $v_y$) for each frame.

The decoder 420 groups per-point features 430 by the frame at which the features are acquired. The decoder 420 is configured to apply the all-frame max-pool module 441 to generate 1D vectors and use a MPL to output single-object sizes for all output frames. The decoder 420 is configured to apply the voting module to each set of time-grouped features to output per-frame object centers. The decoder 420 is configured to apply the per-frame max-pool module 443 to generate low dimensional vectors, such as 3D vectors, and apple the low dimensional vectors to three MPLs to output single features per frame, where each single features per frame may comprise per-frame yaws, per-frame confidences, and per-frame velocities. As an output, the decoder 420 generates predictions for the current tracklet states $S_t$ 227.

In some embodiments, the 4D per-point features are passed into four separate decoding heads of the decoder 420. The first head performs a per-point object-foreground-background segmentation. The second decoding head runs a voting module to regress per-frame object centers. The third decoding head max-pools features per-frame and regresses the per-frame object yaws. Lastly, the fourth decoding head max-pools all per-point features to predict a single object size and track confidence.

In embodiments, with the predictions, two post-processed representations can be computed. First, using the per-frame center estimates for an extended sequence, a quadratic regression is implemented to obtain a second-order motion approximation of the object. Second, using the refined object centers, yaws, and segmentation from the generated predictions for the current tracklet states $S_t$ 227, the original object points can be transformed into the rigid-canonical reference frame. This yields a canonical, aggregated representation of the object which can be referenced for shape analysis, such as to determine shape size, configuration, dimensions, and the like.

Figure 5:
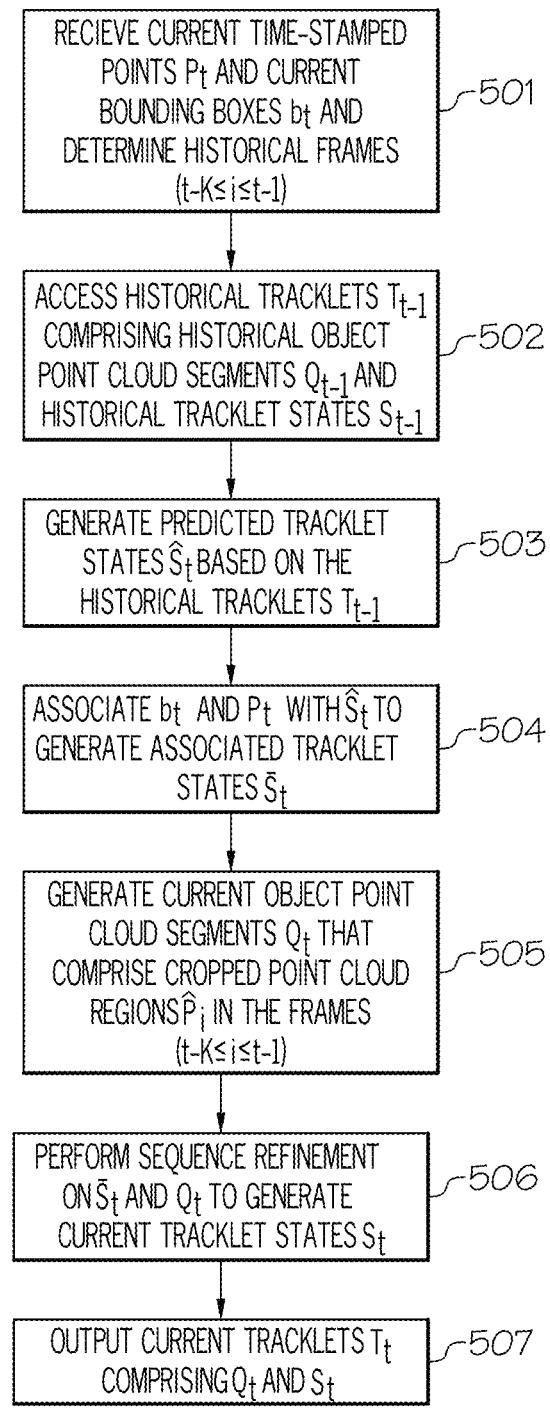
FIG. 5 depicts a flowchart of an example method for processing LIDAR detection data and generating current tracklets in a spatiotemporal multiple-object tracking system, according to one or more embodiments illustrated and described herein.

FIG. 5 depicts a flowchart of an example method for processing LIDAR detection data and generating current tracklets in a spatiotemporal multiple-object tracking system 100. At block 501, the spatiotemporal multiple-object tracking system 100 is configured to receive current time-stamped points $P_t$ 137 and current bounding boxes $b_t$ 147 and determine historical frames (t−K≤i≤t−1). At block 502, the spatiotemporal multiple-object tracking system 100 is configured to query historical tracklets $T_{t-1}$ for historical object point clouds $P_{t-1}$ and historical tracklet states $S_{t-1}$ corresponding to the one or more detected and/or identified objects, for example $S_t(1)$ for object 1 and $S_t(2)$ for object 2 depicted in 301 of FIG. 3. At block 503, the spatiotemporal multiple-object tracking system 100 generates predicted tracklet states $\hat{S}_t$ 223 based on the historical tracklets $T_{t-1}$. At block 504, the spatiotemporal multiple-object tracking system 100 associates $b_t$ and $P_t$ with $\hat{S}_t$ 223 to generate associated tracklet states $\overline{S}_t$ 225. At block 505, the spatiotemporal multiple-object tracking system 100 generates current object point cloud segments $Q_t$ 221 that comprise cropped point cloud regions $P_t$. At block 506, the spatiotemporal multiple-object tracking system 100 performs sequence refinement on $\overline{S}_t$ and $Q_t$ 221 to generate current tracklet states $S_t$ 227. At block 507, the spatiotemporal multiple-object tracking system 100 outputs current tracklets $T_t$ comprising $Q_t$ 221 and $S_t$ 225. It should be understood that the processes of depicted and described with reference to FIG. 5 can be implemented by the computing device 101.

Figure 6:
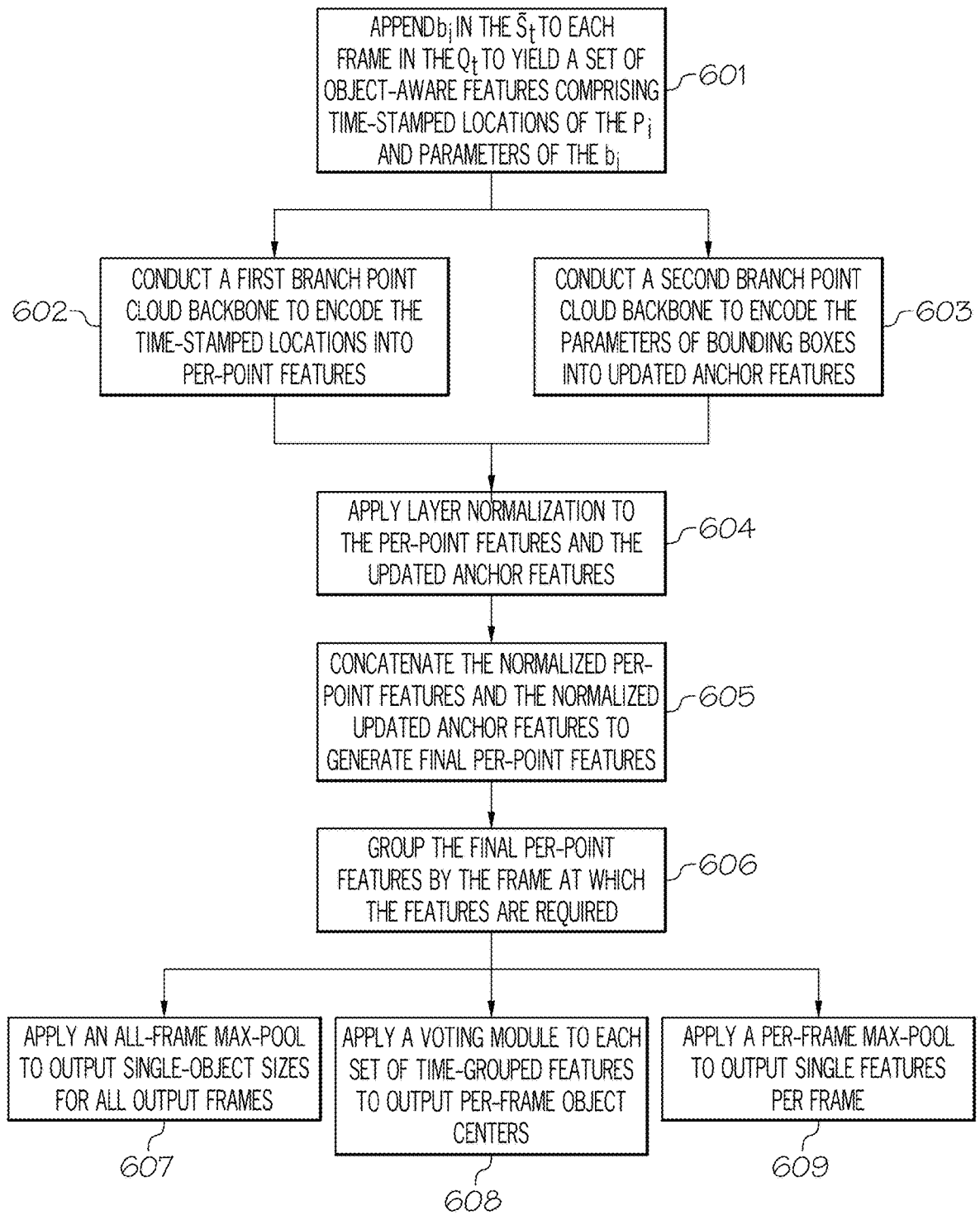
FIG. 6 depicts a flowchart of an example method for refining current tracklet states in a spatiotemporal multiple-object tracking system, according to one or more embodiments illustrated and described herein.

Turning to FIG. 6 a flowchart of an example method for refining current tracklet states in the sequence refinement module 142 is depicted. At block 601, the sequence refinement module 142 is configured to append $b_i$ in the $\overline{S}_t$ 225 to each frame in the $Q_t$ 221 to yield a set of object-aware features comprising time-stamped locations of the $P_t$ and parameters of the $b_i$. At block 602, the sequence refinement module 142 is configured to execute a first branch point cloud backbone to encode the time-stamped locations into per-point features. At block 603, the sequence refinement module 142 is configured to execute a second branch point cloud backbone to encode the parameters of bounding boxes into updated anchor features. At block 604, the sequence refinement module 142 is configured to apply layer normalization to the per-point features and the updated anchor features. At block 605, the sequence refinement module 142 is configured to concatenate the normalized per-point features and the normalized updated anchor features to generate final per-point features 403. At block 606, the sequence refinement module 142 is configured to group the final per-point features by the frame at which the features are acquired. At block 607, the sequence refinement module 142 is configured to apply an all-frame max-pool to output single-object sizes for all output frames. At block 608, the sequence refinement module 142 is configured to apply a voting module to each set of time-grouped features to output per-frame object centers. At block 609, the sequence refinement module 142 is configured to apply a per-frame max-pool to output single features per frame. It should be understood that the processes of depicted and described with reference to FIG. 6 can be implemented by the computing device 101.

It should be understood that blocks of the aforementioned process may be omitted or performed in a variety of orders while still achieving the object of the present disclosure. The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Figure 7:
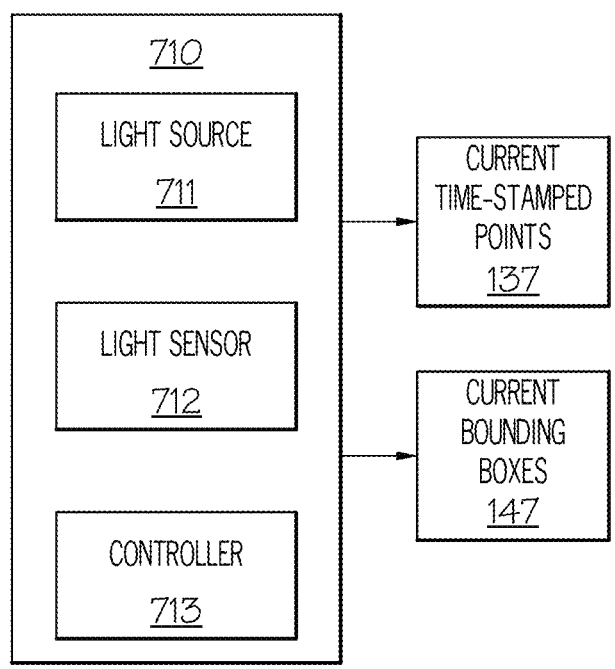
FIG. 7 depicts an illustrative block diagram of an example LIDAR module configured to generate current time-stamped points and current bounding boxes, according to one or more embodiments illustrated and described herein.

Referring to FIG. 7, an illustrative block diagram of an example LIDAR module 710 to generate current time-stamped points and current bounding boxes is depicted. The spatiotemporal multiple-object tracking system 100 may include a LIDAR module 710, such as a LIDAR transceiver. The LIDAR module 710 may include a light source 711, a light sensor 712, and a controller 713. The LIDAR module 710 may emit light waves from its light source to the surroundings, such as attention area. The LIDAR module 710 may further comprise a transmitter. The LIDAR module 710 may create 3D images of the attention area by shooting out pulses of light from the light source through the transmitter to the surround objects. The pulsed light may be scattered at the objects. The scattered light may be detected by the light sensor 712. The controller 713 may calculate the distance from the objects to the LIDAR module 710 by measuring the total time of flight between the LIDAR module 710 and the objects, along with the speed of light. The transmitter may emit multiple beams simultaneously, such as 500,000 pulses/second. The LIDAR module 710 may collect the data of scattered lights and distance to the objects in a 3D manner and determine the current time-stamped points $P_t$ 137 and current bounding boxes $b_t$ 147. In embodiments, the LIDAR module 710 may further comprise an internal measurement unit providing the orientation of the scanning tool. The light source 711 may emit laser, ultraviolet light, visible light, or near infrared light.

Figure 8:
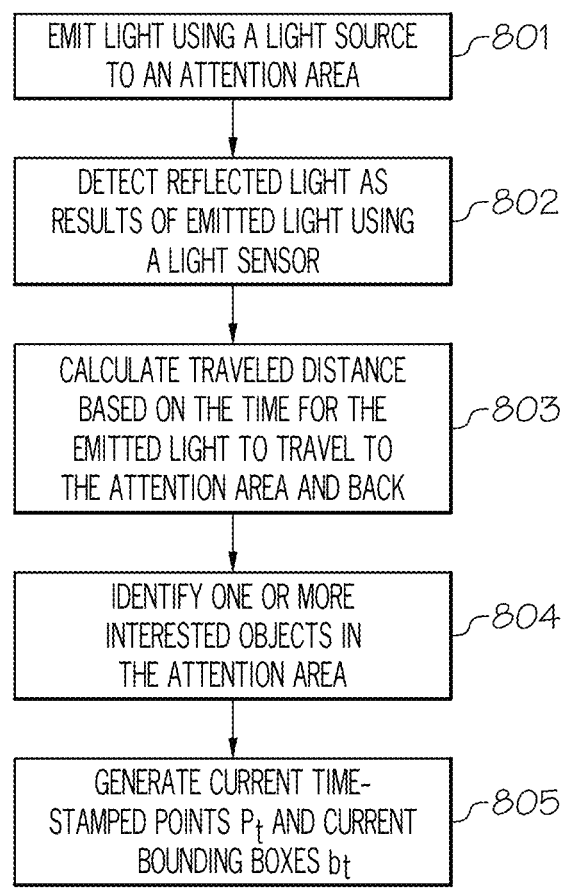
FIG. 8 depicts a flowchart of an example method for detecting objects and generating current time-stamped points and current bounding boxes of the objects, according to one or more embodiments illustrated and described herein.

Referring to FIG. 8 a flowchart of an example method for detecting objects using the LIDAR module 710 is depicted. At block 801, the LIDAR module 710 may emit light using a light source to an attention area. At block 802, the LIDAR module 710 may detect reflected light as results of emitted light using alight sensor. At block 803, the LIDAR module 710 may calculate traveled distance based on the time for the emitted light to travel to the attention area and back. At block 804, the LIDAR module 710 may identify one or more interested objects in the attention area. At block 805, the LIDAR module 710 may generate current time-stamped points $P_t$ 137 and current bounding boxes $b_t$ 147.

The method and system depicted herein may be referred to as SpOT method or system (e.g., the spatiotemporal multiple-object tracking system). For example, the spatiotemporal multiple-object tracking system 100 is interchangeable with SpOT system. The sequence refinement may be referred as SSR.

Figure 9:
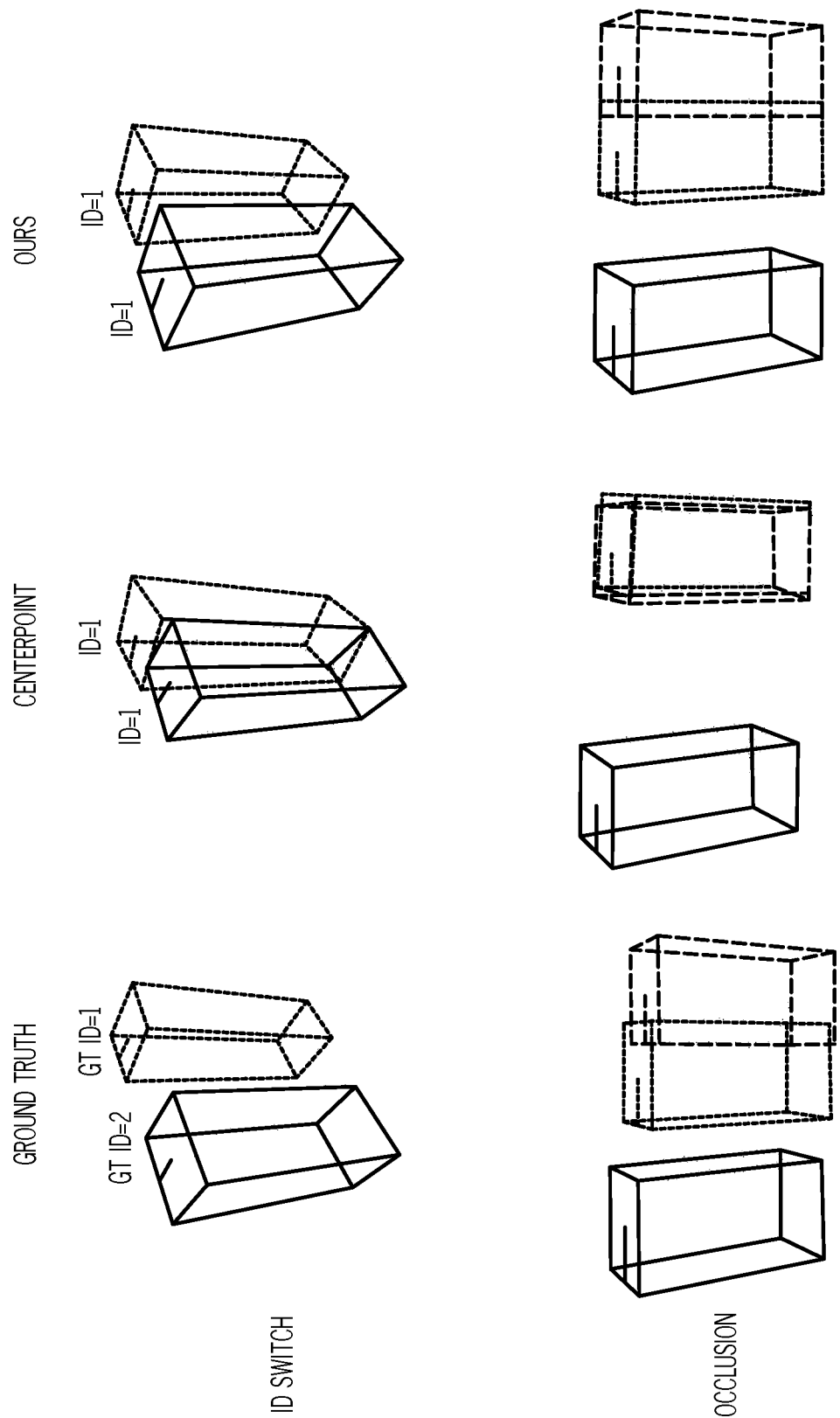
FIG. 9 depicts discontinuous object tracklets generated by the method described herein and by the Ground Truth and CenterPoint in sample 1, according to one or more embodiments illustrated and described herein.

FIG. 9 depicts examples of discontinuous object tracklets. Every 10th prediction is visualized for clarity, and predicted boxes are colored according to L2 center error. The refinement process of the embodiments described herein are robust to different types of input sequence discontinuities. In the first row, the refinement correctly updates bounding boxes to reflect the existence of two disjoint objects. In the second row, it correctly updates bounding boxes to reflect single-object continuity through occlusion.

Figure 10:
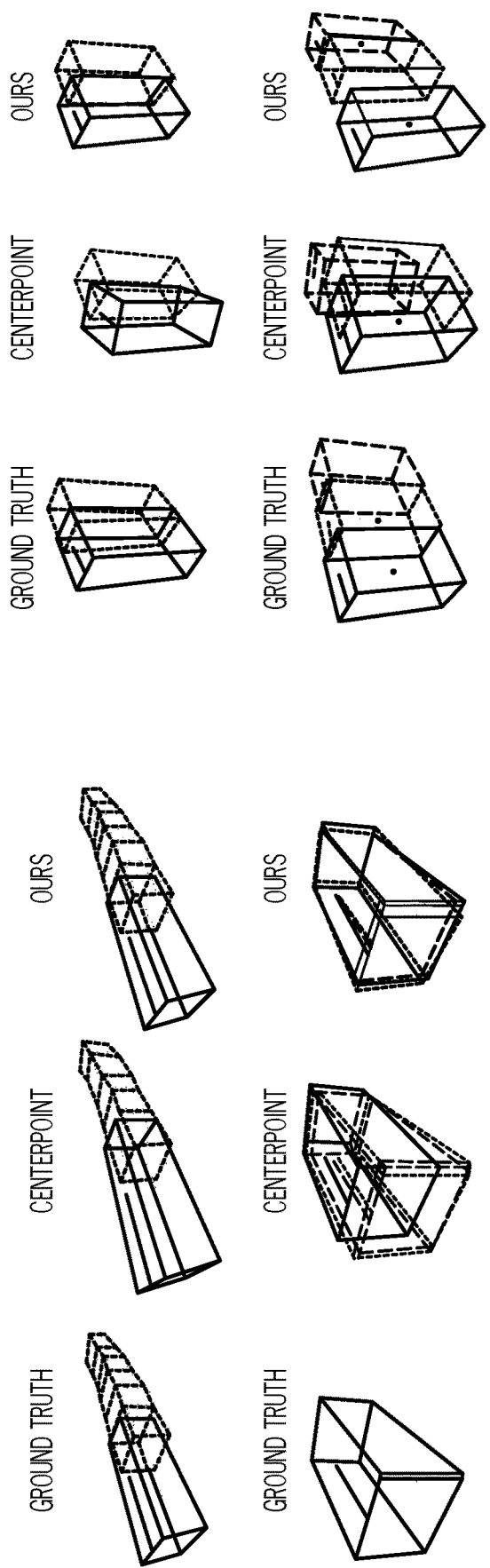
FIG. 10 depicts qualitative results of sequence refinement in sample 2 in comparison with results of Ground Truth and CenterPoint for objects of cars and pedestrians, according to one or more embodiments illustrated and described herein.

The SSR module of SpOT exhibits greater improvements on the nuScenes dataset and on the pedestrian class in general. Sparser LIDAR frames and smaller objects benefit disproportionately from increased temporal context. FIG. 10 illustrates examples of the refined sequences compared to tracklets composed of off-the-shelf CenterPoint detections. The greatest improvement are observed in sequence quality when individual frames are sparse. Furthermore, improved temporal consistency within sequences is observed. Qualitative results of the spatiotemporal sequence refinement are shown in FIG. 10.

Additionally, it is observed that the SSR module can handle noisy input detections and/or associations by learning when to make use of physical priors on object permanence and consistency. Some examples illustrating this property are depicted in FIG. 9. The first row displays an example when both CenterPoint and SpOT encounter an ID-switch error in the tracklet. For CenterPoint, this error will be propagated to future prediction and association. For embodiments of SpOT, which are described herein, even though it cannot retroactively correct the misassociation, the SSR module still refines the sequence bounding boxes in a manner that accurately reflects two disjoint objects. This accurate update helps to avoid future tracking errors. The second row shows a discontinuous sequence due to occlusion where different parts of an object is observed. The SSR module of the present disclosure refines the occluded region in a manner that reflects temporal continuity of a single object.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for multiple object tracking comprising:
receiving, with a computing device, a point cloud dataset;
detecting one or more objects in the point cloud dataset, each of the detected one or more objects defined by points of the point cloud dataset and a bounding box;
querying one or more historical tracklets for historical tracklet states corresponding to each of the one or more detected objects;
implementing a 4D encoding backbone comprising two branches:
a first branch configured to compute per-point features for each of the one or more objects and the corresponding historical tracklet states, and
a second branch configured to obtain 4D point features;
concatenating the per-point features and the 4D point features; and
predicting, with a decoder receiving the concatenated per-point features, current tracklet states for each of the one or more objects.

2. The method of claim 1, wherein the first branch comprises a PointNet architecture.

3. The method of claim 1, wherein the second branch comprises farthest point sampling and a local radii PointNet encoder to obtain the 4D point features PointNet architecture.

4. The method of claim 1, wherein the second branch comprises a set abstraction layer to subsample a set of anchor features in each frame of the point cloud dataset and a plurality of self-attention layers to generate updated anchor features.

5. The method of claim 1, wherein the decoder implemented to predict the current tracklet states comprises a plurality of separate decoding heads.

6. The method of claim 5, wherein at least one of the plurality of separate decoding heads comprises at least one of:
a first decoding head of the decoder configured to perform a per-point object-foreground-background segmentation,
a second decoding head configured to regress per-frame object centers,
a third decoding head configured to regresses per-frame object yaws, or
a fourth decoding head configured to predict a single object size and a confidence score.

7. The method of claim 1, further comprising generating point cloud data of an environment with a LIDAR module communicatively coupled to the computing device, wherein the generated point cloud data forms the point cloud dataset received by the computing device.

8. A system for multiple object tracking comprising:
a computing device, the computing device comprising a processor and a memory storing instructions that, when executed by the processor, cause the computing device to:
receive a point cloud dataset;
detect one or more objects in the point cloud dataset, each of the detected one or more objects defined by points of the point cloud dataset and a bounding box;
query one or more historical tracklets for historical tracklet states corresponding to each of the one or more detected objects;
implement a 4D encoding backbone comprising two branches:
a first branch configured to compute per-point features for each of the one or more objects and the corresponding historical tracklet states, and
a second branch configured to obtain 4D point features;
concatenate the per-point features and the 4D point features; and
predict, with a decoder receiving the concatenated per-point features, current tracklet states for each of the one or more objects.

9. The system of claim 8, wherein the first branch comprises a PointNet architecture.

10. The system of claim 8, wherein the second branch comprises farthest point sampling and a local radii PointNet encoder to obtain the 4D point features PointNet architecture.

11. The system of claim 8, wherein the second branch comprises a set abstraction layer to subsample a set of anchor features in each frame of the point cloud dataset and a plurality of self-attention layers to generate updated anchor features.

12. The system of claim 8, wherein the decoder implemented to predict the current tracklet states comprises a plurality of separate decoding heads.

13. The system of claim 12, wherein at least one of the plurality of separate decoding heads comprises at least one of:
a first decoding head of the decoder configured to perform a per-point object-foreground-background segmentation,
a second decoding head configured to regress per-frame object centers,
a third decoding head configured to regresses per-frame object yaws, or a fourth decoding head configured to predict a single object size and a confidence score.

14. The system of claim 8, further comprising a LIDAR module, the LIDAR module communicatively coupled to the computing device and configured to generate point cloud data of an environment forming the point cloud dataset received by the computing device.

15. A computing program product for multiple object tracking, the computing program product comprising machine-readable instructions stored on a non-transitory computer readable memory, which when executed by a computing device, causes the computing device to carry out steps comprising:
  receiving, with the computing device, a point cloud dataset;
  detecting one or more objects in the point cloud dataset, each of the detected one or more objects defined by points of the point cloud dataset and a bounding box;
  querying one or more historical tracklets for historical tracklet states corresponding to each of the one or more detected objects;
  implementing a 4D encoding backbone comprising two branches:
    a first branch configured to compute per-point features for each of the one or more objects and the corresponding historical tracklet states, and
    a second branch configured to obtain 4D point features;
  concatenating the per-point features and the 4D point features; and
  predicting, with a decoder receiving the concatenated per-point features, current tracklet states for each of the one or more objects.

16. The computer program product of claim 15, wherein the first branch comprises a PointNet architecture.

17. The computer program product of claim 15, wherein the second branch comprises farthest point sampling and a local radii PointNet encoder to obtain the 4D point features PointNet architecture.

18. The computer program product of claim 15, wherein the second branch comprises a set abstraction layer to subsample a set of anchor features in each frame of the point cloud dataset and a plurality of self-attention layers to generate updated anchor features.

19. The computer program product of claim 15, wherein the decoder implemented to predict the current tracklet states comprises a plurality of separate decoding heads.

20. The computer program product of claim 19, wherein at least one of the plurality of separate decoding heads comprises at least one of:
  a first decoding head of the decoder configured to perform a per-point object-foreground-background segmentation,
  a second decoding head configured to regress per-frame object centers,
  a third decoding head configured to regresses per-frame object yaws, or
  a fourth decoding head configured to predict a single object size and a confidence score.

* * * * *